United States Patent
Cropper et al.

(10) Patent No.: US 9,600,345 B1
(45) Date of Patent: *Mar. 21, 2017

(54) REBALANCING VIRTUAL RESOURCES FOR VIRTUAL MACHINES BASED ON MULTIPLE RESOURCE CAPACITIES

(71) Applicant: International Business Machines Corporation, Armonk, NY (US)

(72) Inventors: Joseph W. Cropper, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,626

(22) Filed: Mar. 11, 2016

Related U.S. Application Data (63) Continuation of application No. 15/011,141, filed on Jan. 29, 2016.

(51) Int. Cl.
*G06F 9/50* (2006.01)
*G06F 9/455* (2006.01)

(52) U.S. Cl.
CPC ........ *G06F 9/5077* (2013.01); *G06F 9/45558* (2013.01); *G06F 9/5083* (2013.01); *G06F 2009/4557* (2013.01)

(58) Field of Classification Search
CPC ........................... G06F 9/5083; G06F 9/45558
See application file for complete search history.

(56) References Cited

U.S. PATENT DOCUMENTS

| | | | |
|---|---|---|---|
| 6,985,937 B1 | 1/2006 | Keshav et al. | |
| 6,986,137 B1 | 1/2006 | King et al. | |
| 8,095,929 B1 | 1/2012 | Ji et al. | |
| 8,175,863 B1 | 5/2012 | Ostermeyer et al. | |
| 8,321,554 B2 | 11/2012 | Dickinson | |
| 8,458,714 B2 | 6/2013 | King et al. | |
| 8,732,291 B2 | 5/2014 | Zhu et al. | |
| 9,110,779 B2 | 8/2015 | Ashok et al. | |
| 9,158,668 B2 | 10/2015 | Ashok et al. | |
| 9,176,764 B1 * | 11/2015 | Jorgensen | G06F 9/4555 |
| 2007/0067776 A1 * | 3/2007 | McCarthy | G06F 9/5011 718/104 |

(Continued)

OTHER PUBLICATIONS

Cler, Configuring Processor Resources for System p5 Shared-Processor Pool Micro-Partitions, IBM Systems Magazine, Aug. 2006, ibmsystemsmag.com/aix/administrator/systemsmanagement/Configuring-Processor-Resources-for-System-p5-Shar/, p. 1-3.

(Continued)

*Primary Examiner* — Abdullah Al Kawsar
*Assistant Examiner* — Jorge A Chu Joy-Davila
(74) *Attorney, Agent, or Firm* — Middleton Reutlinger (57) ABSTRACT

A workload of a virtualized computing environment is rebalanced by resizing and/or moving one or more virtual machines allocated resources from a shared pool of resources in the virtualized computing environment based upon multiple resource capacities specified for each virtual machine and representing different portions of the resources from the shared pool of resources, e.g., minimum and desired resource capacities.

10 Claims, 7 Drawing Sheets

(56) References Cited

U.S. PATENT DOCUMENTS

| | | | | |
|---|---|---|---|---|
| 2009/0119664 A1* | 5/2009 | Pike | ................... | G06F 9/45558 718/1 |
| 2012/0066020 A1 | 3/2012 | Moon et al. | | |
| 2012/0304170 A1 | 11/2012 | Morgan | | |
| 2014/0082612 A1* | 3/2014 | Breitgand | ........... | G06F 9/45533 718/1 |
| 2015/0058861 A1 | 2/2015 | Zheng et al. | | |
| 2015/0248305 A1* | 9/2015 | Shu | ................... | G06F 9/45558 718/1 |

OTHER PUBLICATIONS

Epping, DRS Deepdive, Yellow Bricks, yellow-bricks.com/drs-deepdive, p. 1-5, captured by archive.org Jan. 30, 2015.

Brix, Understanding VMware Reservations Limits and Shares, Sep. 19, 2013, vfrank.org/2013/09/19/understanding-vmware-reservations-limits-and-shares/, p. 1-7.

Amazon EC2 Instances, Amazon Web Services, Inc., aws.amazon.com/ec2/instance-types/, p. 1-13, captured by archive.org Jan. 27, 2015.

List of IBM Patents or Patent Applications Treated as Related.

U.S. Patent and Trademark Office, Office Action issued in related U.S. Appl. No. 15/011,141 dated Jun. 3, 2016.

U.S. Patent and Trademark Office, Notice of Allowance issued in related U.S. Appl. No. 15/011,141 dated Sep. 30, 2016.

\* cited by examiner

REBALANCING VIRTUAL RESOURCES FOR VIRTUAL MACHINES BASED ON MULTIPLE RESOURCE CAPACITIES

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources from multiple hosts are provisioned and de-provisioned based on workload changes. In such applications, individual workloads may change over time, and as such virtualization may be employed to effectively multiplex hardware resources over multiple workloads to provide an overall greater resource utilization. In order to balance costs, an assumption may be made that not all workloads will run with maximum resource requirements at the same time, so fewer hardware resources than the sum of all maximum resource requirements for workloads may be allocated for a given set of workflows, resulting in the hardware resources being overcommitted. As one example, a cloud provider may allocate more virtual processors (CPUs) across multiple virtual machines on a particular host computer under the assumption that some of the virtual machines will only run at off-peak hours when other virtual machines are shut down or otherwise deactivated.

Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

In some virtualized computing environments, types of resources such as processors, memory, storage, networks, etc. are managed in shared pools, and virtual machines are placed on one or more hosts based upon resource capacities assigned to such virtual machines. These resource capacities may, in some instances, be specified by administrators or even consumers, and may represent portions of a shared pool of resources that are to be allocated to particular virtual machines. For example, in some environments, a virtual machine may be assigned one or more processor cores and/or fractions of a processor core (e.g., 1.5 CPUs from 10 CPUs available in the shared pool), or may be assigned a portion of the computing power of one or more processor cores (e.g., 1 GHz from 40 GHz available in the shared pool).

Optimizing the placement of virtual machines and the allocation of hardware resources to virtual machines can improve the performance and responsiveness of virtual machines while also utilizing the resources of a virtual computing environment in an efficient and cost effective manner. Accordingly, a continuing need exists in the art for optimizing the placement of virtual machines and the allocation of hardware resources in a virtual computing environment.

SUMMARY

According to an embodiment of the present invention, a workload of a virtualized computing environment of a type including a shared pool of resources disposed in a plurality of hosts and a plurality of virtual machines resident on the plurality of hosts and configured to share the shared pool of resources may be rebalanced. The virtualized computing environment may store, for each virtual machine among the plurality of virtual machines, a respective first resource capacity that represents a first portion of the shared pool of resources for the respective virtual machine and a respective second resource capacity that represents a second portion of the shared pool of resources for the respective virtual machine that is greater than that of the first resource capacity. The workload may be balanced by identifying a virtual machine among the plurality of virtual machines that is allocated a smaller portion of the shared pool of resources than that of the respective second resource capacity for the respective second portion, determining using at least one processor if a home host for the identified virtual machine has sufficient unused capacity to support allocating to the identified virtual machine the respective second resource capacity for the identified virtual machine on the home host, and in response to determining that the home host for the identified virtual machine has sufficient unused capacity to support allocating to the identified virtual machine the respective second resource capacity for the identified virtual machine on the home host, resizing the identified virtual machine on the home host to allocate at least the respective second resource capacity to the identified virtual machine.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

It is understood in advance that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
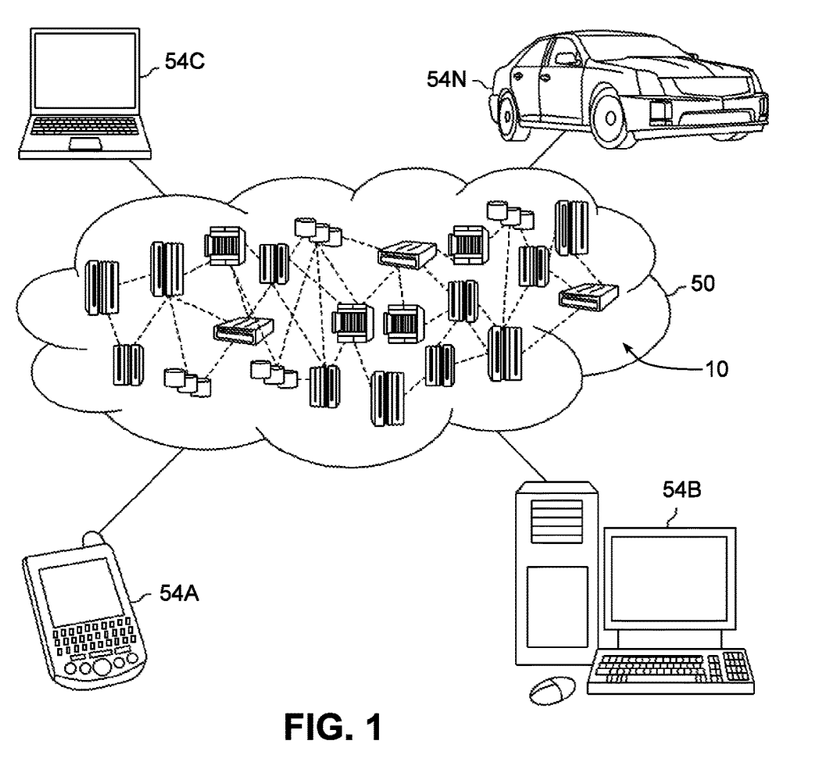
FIG. 1 depicts an example cloud computing environment consistent with the invention.

Referring now to the Drawings, wherein like numbers denote like parts throughout the several views, FIG. 1 depicts an illustrative cloud computing environment 50 suitable for use in embodiments consistent with the invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
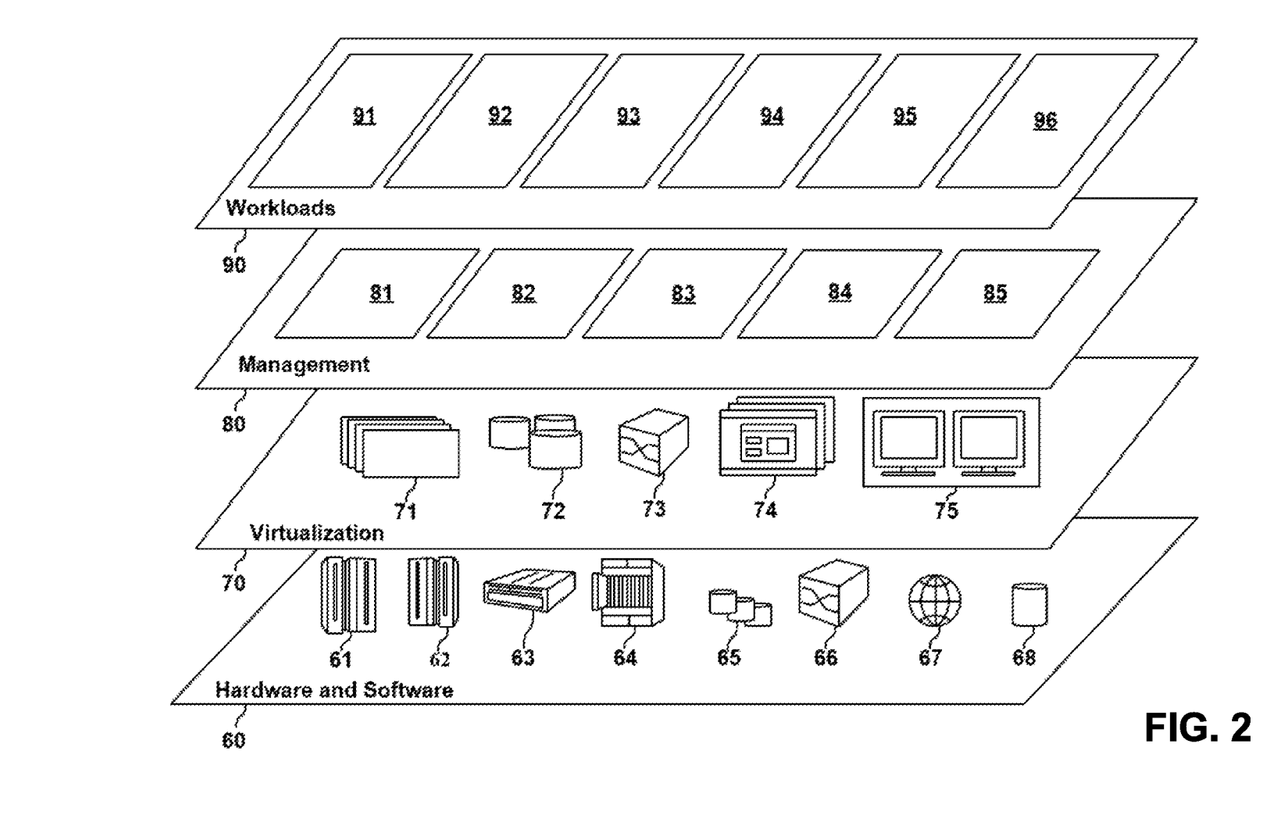
FIG. 2 depicts abstraction model layers according to an example embodiment consistent with the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3A:
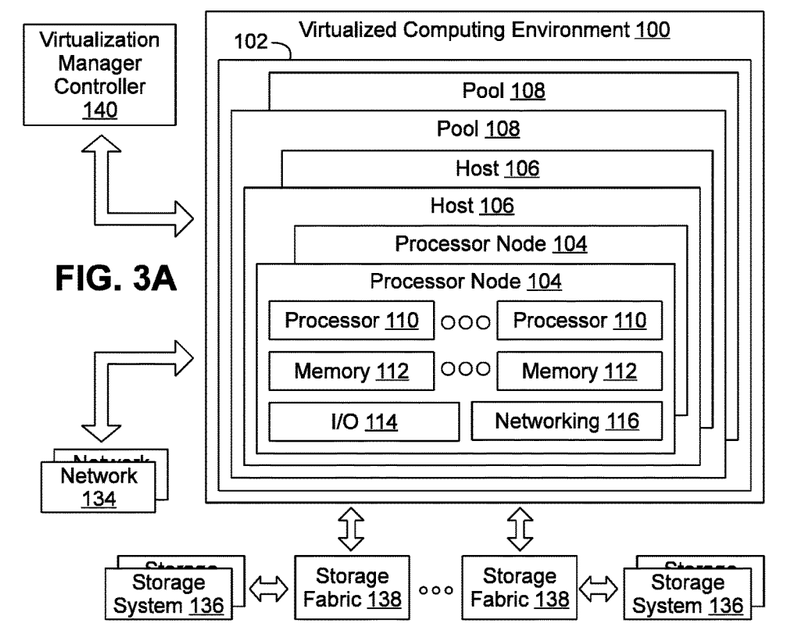
FIGS. 3A and 3B are block diagrams of an example hardware (FIG. 3A) and software (FIG. 3B) environment suitable for implementing a virtualized computing environment consistent with the invention.
Figure 3B:
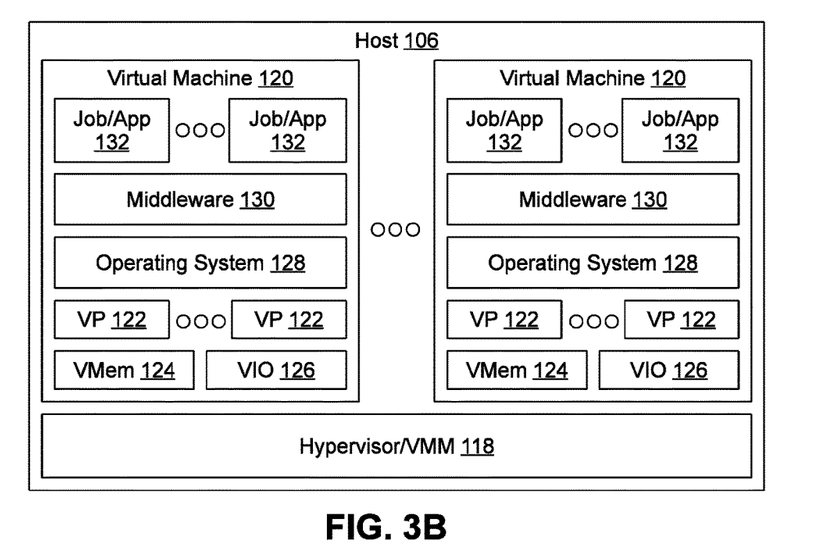

FIGS. 3A-3B illustrate the principal hardware and software components in a virtualized computing environment or apparatus 100 consistent with the invention, and suitable for implementation in a cloud computing environment such as environment 50, as well as in other cloud and/or non-cloud computing environments. As shown in FIG. 3A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 3B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1, 2, 3A and 3B is not intended to limit the present invention. Indeed, those skilled in the art will recognize that other alternative hardware and/or software environments may be used without departing from the scope of the invention.

Rebalancing Virtual Resources Based on Multiple Resource Capacities

Most cloud consumers expect to receive a guaranteed minimum level of performance (a need) for their applications. Many of those consumers, however, would also like to obtain an even higher level of performance if possible (a want). Existing approaches for cloud providers to address these expectations and desires have not, however, been efficient or cost-effective, as haphazard over-commitment of resources is generally not a viable option because performance generally cannot be guaranteed.

One approach some cloud providers may use is to assign dedicated hardware to each consumer. The consumer obtains the guaranteed performance without losing capacity due to other workloads sharing those resources. However, for the cloud provider, this approach is very cost inefficient model because dedicated hardware resources are allocated to each consumer even when those consumers are not actually using those resources. A more typical and cost effective model is to pool hardware resources for sharing by multiple consumers. With this model, virtual machines may be placed assuming 100% of the resources specified for the virtual machine are available and assuming all resources are equal and all virtual machine workloads are equal in priority.

A more preferable model for many cloud consumers would be to have the ability to specify a minimum level of performance (e.g., the minimum speed of the processor(s)) they need along with a higher level of performance (e.g., the speed of the processor(s)) they would prefer to have, so that the higher level of performance can be achieved whenever system workload permits, but still ensuring the minimum level of performance is still provided even when system workload is high. In addition, it may be desired to enable consumers to assign priorities or weightings to virtual machines to control what virtual machines receive additional resources when system resource availability permits.

Embodiments consistent with the invention may address these expectations and desires by rebalancing the workload of a virtualized computing environment based upon multiple resource capacities specified for individual virtual machines that share a shared pool of resources distributed across multiple hosts in the virtualized computing environment. In this regard, a resource capacity assigned or specified for a virtual machine may refer to a portion of a shared pool of a particular type of hardware resource that may be allocated to a virtual machine. Hardware resources may include, for example, computing resources such as processors, processor cores, hardware threads, computers, etc., as well as other types of resources such as memory, storage, and network resources. As such, a resource capacity for a virtual machine may refer to a portion of a shared pool, e.g., for processor resources, a speed specified in GHz, or numerical or percentage value representing a processor, multiple processors and/or a fraction of a processor (e.g., 1.5 CPUs or 33% of a CPU).

In some embodiments, the multiple resource capacities for a particular virtual machine may include, for example, first and second resource capacities, where the second resource capacity represents a larger portion of a shared pool than the first resource capacity. In some embodiments, for example, the first resource capacity may be a minimum resource capacity that represents an assured portion of a shared pool of resources for a virtual machine, while a second resource capacity may be a desired resource capacity that represents a desired portion of the shared pool of resources for the virtual machine that is greater than the assured portion represented by the minimum resource capacity. In addition, in some virtualized computing environments, the minimum resource capacity may be referred to as a "reserved" capacity and the desired resource capacity may be referred to as a "configured" capacity. In addition, in some embodiments, virtual machines may also be assigned or specified a priority or weight, e.g., a shared weight that represents a ratio to which a virtual machine receives unused resource capacity relative to other virtual machines on the same host, that may be used to control how available resources are allocated to virtual machines assigned to a shared pool of resources.

In some embodiments of the invention, for example, rebalancing logic may be used to attempt to optimize virtual machine placement for shared resources leveraging an ability to share with at least a first (e.g., a minimum or guaranteed) resource capacity but also accommodating a larger second (e.g., a desired) resource capacity. Such rebalancing logic may make rebalancing decisions in some embodiments on a periodic basis by looking across a virtualized computing environment and considering environment changes. As opposed to approaches in which virtual machines are optimized based on an assumption that 100% of the virtual machine configuration or 100% of the desired capacity is available, embodiments consistent with the invention may utilize multiple resource capacities, as well as a shared weight or other priority or weighting in order to more effectively balance needs and wants for maximum utilization.

In some embodiments, for example, when an environment changes such as due to an addition or deletion of a host or a change in capacity of a host (e.g., due to an addition of additional processors or memory via physical changes, a capacity on demand increase, etc.), desired, minimum, and shared weight values of the virtual machines in the environment may be used to determine an optimal rebalancing of the resources assigned to the virtual machines and then resize, and in some instances, migrate virtual machines given the determined optimal rebalancing.

Figure 4:
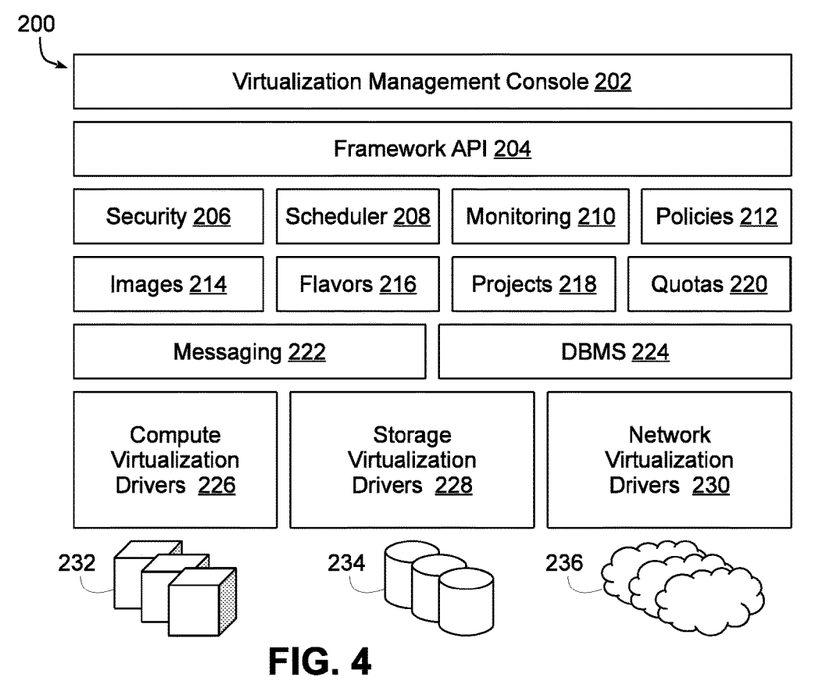
FIG. 4 is a block diagram of example software components in a cloud computing framework for use in performing virtualization management in the virtualized computing environment of FIGS. 3A-3B.

In one embodiment, for example, the herein-described functionality may be implemented within placement, resource optimization or scheduler logic in a cloud or virtualized computing environment, e.g., within a virtualization manager of a cloud computing framework such as framework 200 of FIG. 4. Framework 200 may be based in some embodiments on the OpenStack architecture, and may include a virtualization management console 202 that interfaces with the framework through a framework API 204. Framework 200 may be considered to implement at least a portion of a computer-implemented virtualization or cloud manager, and may include a management service layer includes a security service 206, a scheduler service 208, and monitoring service 210, which respectively provide security, virtual machine scheduling/placement and event monitoring functionality. Additional management functionality manages various persisted entities in the framework, including policies 212, images 214, flavors 216, projects 218 and quotas 220. Policies 212 may include policies related to virtualization management. Images 214 refer to disk or server images for virtual machines, including images used for templates, as well as images used for backups. Flavors 216 refer to virtual hardware templates that define various configuration settings for virtual machines, e.g., sizes for virtual memory, disk, virtual CPUs, etc. Projects 218 refer to tenants, or groups of users, and quotas 220 refer to operational limits established for different projects.

A middleware layer may include a messaging service 222, e.g., an AMQP (Advanced Message Queuing Protocol) message broker, and a database service (DBMS) 224. In addition, virtualization drivers, e.g., compute virtualization drivers 226, storage virtualization drivers 228, and network virtualization drivers 230 respectively interface with physical compute resources 232, physical storage resources 234 and physical network resources 236.

Elements of framework 200 may be implemented, for example, in a virtualization manager controller 140 (FIG. 3A), with other elements implemented within one or more hosts, e.g., within one or more virtual machines resident on one or more hosts. In other embodiments, however, various elements of framework 200 may be implemented in other hardware, whether external or internal to a virtualized computing environment.

Framework 200 may be configured to receive requests from users such as administrators or consumers for various types of virtual machine management operations, and in response thereto, to initiate performance of those operations within a virtualized or cloud computing environment. Furthermore, framework 200 may detect certain changes in the virtual computing environment, e.g., the addition of a new host, the removal of a host, a change in a host's resource capacity (either actual or through capacity on demand changes), etc.

In the illustrated embodiment discussed below, properties, referred to herein as minimum resource capacity and desired resource capacity, may be maintained for virtual machines. In addition, in some embodiments, a priority or weighting property, e.g., a shared weight, may be maintained for each virtual machine, and moreover, minimum and/or desired resource capacities properties may be maintained for multiple types of hardware resources, e.g., processor and memory resources. Further, in some embodiments virtual machine may also include a property that indicates whether a resource can exceed its desired value (i.e., whether the virtual machine is uncapped). While two resource capacities are specified for each virtual machine in the illustrated embodiment, it will be appreciated that in other embodiments additional resource capacity properties, e.g., three or more resource capacities, may be specified for a virtual machine. It will also be appreciated that the properties may be specified by an administrator or a consumer through an appropriate interface, e.g., a virtualization or cloud manager.

In some embodiments, rebalancing logic, e.g., as implemented in an optimizer or other component in framework 200 of FIG. 4, may run periodic checks of the virtualized computing environment to look for changes and, based on those changes, determine if rebalancing is necessary or desirable. In other embodiments, rebalancing logic may perform a rebalancing based on a notification or inline call from cloud management software, e.g., as initiated by an administrator. Detected changes may include, for example, addition of a new host, removal of a host, modification of a host to add or remove a resource, etc., and changes that trigger a rebalancing may compared against a threshold in some embodiments such that rebalancing is performed only when the changes are substantial enough to appreciably impact the overall allocation of resources in a shared pool. Further, in some embodiments, rebalancing may be initiated manually by an administrator and/or consumer, and irrespective of whether any changes have occurred in the virtualized computing environment.

As such, whenever a change meriting rebalancing is detected, or whenever a rebalancing is otherwise initiated, rebalancing logic may use desired and minimum resource capacity properties, and in some instances, shared weights, in a rebalancing placement policy that attempts to balance workload while accommodating when possible allocations to one or more virtual machines that are above the minimum resource capacities of those virtual machines.

Figure 5:
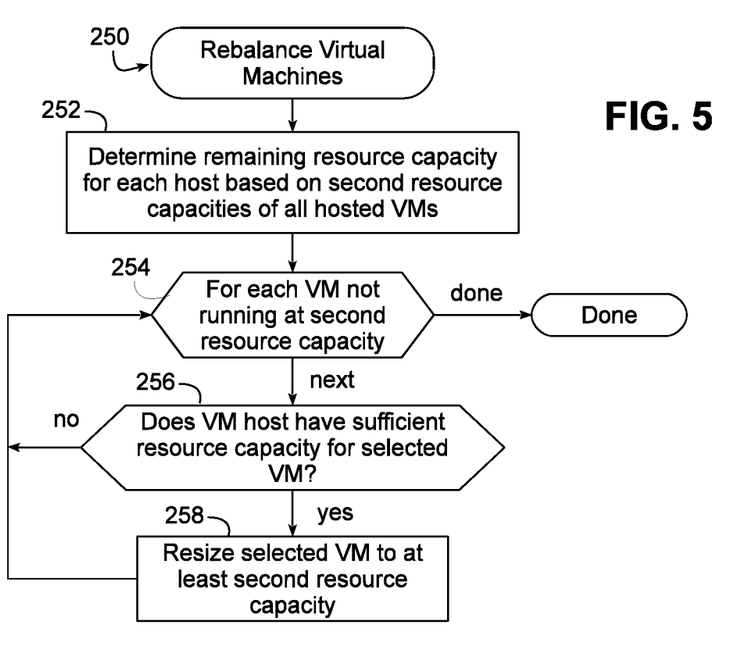
FIG. 5 is a flowchart illustrating an example sequence of operations for rebalancing virtual machines in the virtualized computing environment of FIGS. 3A-3B.

FIG. 5, for example, illustrates one example sequence of operations 250 suitable for rebalancing virtual machines that have been allocated resources from a shared pool of resources in a virtualized computing environment and consistent with some embodiments of the invention. In this embodiment, a virtualized computing environment may include a shared pool of resources disposed in a plurality of hosts and a plurality of virtual machines resident on the plurality of hosts and configured to share the shared pool of resources, and with each virtual machine having a first resource capacity that represents a first portion of the shared pool of resources a second resource capacity that represents a second portion of the shared pool of resources that is greater than that of the first resource capacity. These resource capacities may be stored in the virtualized computing environment, and assigned, specified, or otherwise configured by an administrator, a consumer, whether through a user interface, using a template or flavor, in another manner as will be appreciated by one of ordinary skill in the art having the benefit of the instant disclosure.

In sequence of operations 250, block 252 initially determines a remaining resource capacity for each host providing resources in the shared pool of resources. This remaining resource capacity may be based on the second, higher resource capacities maintained for the virtual machines resident on the respective host. Thus, if a particular host has 20 GHz of processor capacity, and the sum of the second resource capacities specified for the virtual machines resident on that host is 15 GHz, the remaining resource capacity for that host would be 5 GHz.

Next, block 254 initiates a FOR loop to identify and process one or more virtual machines that are allocated smaller portions of the shared pool of resources than that of their respective second resource capacities, which in many instances is at least the first resource capacities, but could be allocations that are between the first and second resource capacities. For each such identified virtual machine, block 256 may determine whether the host upon which that identified virtual machine is currently placed, also referred to herein as the "home" host of the virtual machine, has sufficient unused or remaining capacity (as calculated in block 252) to support allocating to the identified virtual machine the second resource capacity specified for that identified virtual machine.

If not, block 256 returns control to block 254 to attempt to identify additional virtual machines meeting the aforementioned condition. If sufficient unused capacity does exist, however, block 256 in response passes control to block 258 to resize the identified virtual machine on the home host to allocate at least the respective second resource capacity to the identified virtual machine. Resizing, within this context, allocates additional resources from the shared pool of resources to the identified virtual machine such that after resizing the identified virtual machine is allocated an amount of resources from the shared pool of resources that equals or exceeds that of the second resource capacity. Once the identified virtual machine is resized, block 258 then returns to block 254 to attempt to identify additional virtual machines meeting the aforementioned condition, and once no further virtual machines are identified, the rebalancing operation is complete.

In other embodiments, a rebalancing operation may implement a multi-step placement policy that also supports migrating virtual machines to different hosts if resizing is not appropriate on home hosts. In some embodiments, for example, a placement policy may try to first accommodate second resource capacities on home hosts, then try to accommodate second resource capacities on other hosts, preferring hosts with the most unused or remaining resource capacity and/or the least resource contention, and then revert to searching for a host using the first resource capacity whenever the second resource capacity cannot be accommodated for a particular virtual machine.

Figure 6A:
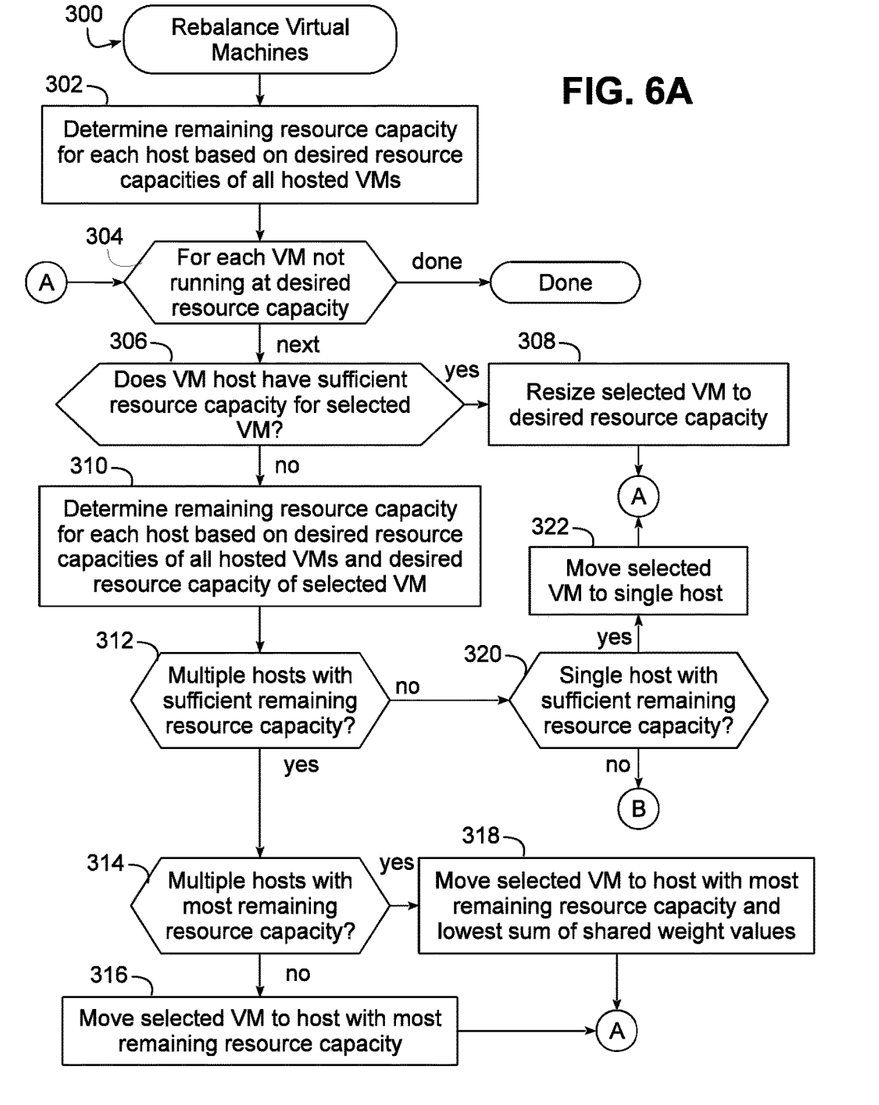
FIGS. 6A-6B are a flowchart illustrating another example sequence of operations for rebalancing virtual machines in the virtualized computing environment of FIGS. 3A-3B.
Figure 6B:
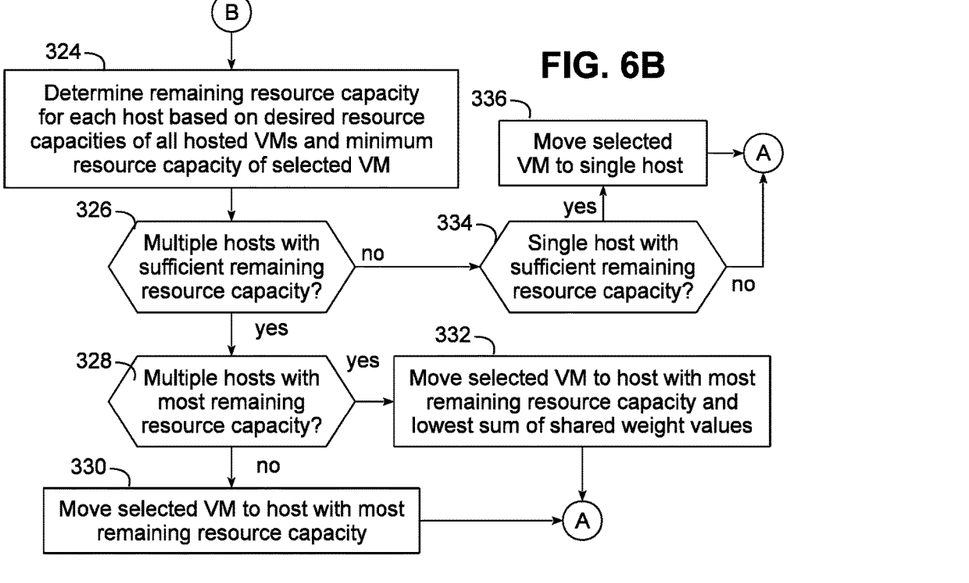

For example, FIGS. 6A-6B illustrate another sequence of operations 300 that may implement a multi-step placement policy used to rebalance virtual machines based upon first resource capacities representing minimum resource capacities and second resource capacities representing desired resource capacities, as well as shared weights representing relative priorities or weightings to apply to different virtual machines.

As illustrated in FIG. 6A, sequence of operations 300 may begin in block 302 by determining, for each host, the resource capacity remaining after the desired resource capacity for each virtual machine currently placed on the host is accounted for. For example, in one embodiment where the resource is a processor resource, the remaining resource capacity may be calculated by dividing the sum of all desired resource capacities for virtual machines placed on the host by the total number of processors on the host.

Next, block 304 initiates a FOR loop to attempt to identify and process each virtual machine allocated resources from the shared pool of resource that is allocated fewer resources than the desired resource capacity specified therefor. For each such identified virtual machine, control passes to block 306 to determine whether the home host upon which the virtual machine is currently placed has sufficient unused or remaining capacity (as calculated in block 302) to support resizing the virtual machine and allocate thereto the desired resource capacity to the virtual machine. If so, control passes to block 308 to resize the identified virtual machine on the home host to allocate at least the desired resource capacity to the identified virtual machine, and control returns to block 304 to identify and process any additional virtual machines allocated below their desired resource capacities.

Returning to block 306, if the home host for the identified virtual machine does not have enough unused resource capacity, control passes to block 310 to determine remaining resource capacity for each host (optionally excluding the home host) based upon the desired resource capacities of all hosted virtual machines and the desired resource capacity of the identified virtual machine. The determined remaining resource capacity for each host in block 310 may be calculated for a host in some embodiments by dividing the sum of all desired resource capacities for virtual machines placed on the host and the desired resource capacity for the identified virtual machine by the total resources from the shared pool on the host, e.g., where the resources are processors, the number of processors on the host. The determined remaining resource capacities may then be used to attempt to identify one or more candidate hosts that have sufficient unused capacity to support allocating to the identified virtual machine the desired resource capacity for the identified virtual machine on the candidate host after accounting for the respective desired resource capacities for the other virtual machines placed on the candidate host.

It will be appreciated that multiple candidate hosts may have sufficient remaining resource capacities, and as such, block 310 passes control to block 312 to determine whether multiple such candidate hosts exist. If so, control passes to block 314 to determine which, among the multiple candidate hosts, have the most (or greatest) unused remaining resource capacity, e.g., the lowest value calculated in block 310. Block 314, in particular, determines whether multiple candidate hosts have the most unused remaining resource capacity, and if not (indicating that there is a single candidate host having the most remaining resource capacity) control passes to block 316 to migrate or move the identified virtual machine to that single candidate host and allocate to that identified virtual machine the desired resource capacity for the identified virtual machine on the candidate host. Control then returns to block 304 to process additional virtual machines.

Returning to block 314, if multiple candidate hosts have the most unused remaining resource capacity (e.g., two or more candidate hosts have the same value calculated in block 310), control may pass to block 318 to select one of the candidate hosts to minimize resource contention, e.g., based upon priorities or weightings such as shared weights assigned to the virtual machines. For example, block 318 may select a candidate host where the sum of shared weight values for all virtual machines placed on the host is the lowest, whereby the identified virtual machine is moved to that candidate host and allocated the desired resource capacity. Control then returns to block 304 to process additional virtual machines.

Returning to block 312, if multiple candidate hosts are not identified, control passes to block 320 to determine if there is a single host having sufficient remaining resource capacity. If so, control passes to block 322 to move the identified virtual machine to the single host and allocate the desired resource capacity to the identified virtual machine. Control then returns to block 304 to process additional virtual machines.

Returning to block 320, if no host is identified having sufficient remaining resource capacity based upon the calculations in block 310, control passes to block 324 to perform similar calculations based, instead of the desired resource capacity for the identified virtual machine as discussed above in connection with block 310, the minimum resource capacity for the identified virtual machine. Specifically, block 324 determines remaining resource capacity for each host (optionally excluding the home host) based upon the desired resource capacities of all hosted virtual machines and the minimum resource capacity of the identified virtual machine. The determined remaining resource capacity for each host in block 324 may be calculated for a host in some embodiments by dividing the sum of all desired resource capacities for virtual machines placed on the host and the minimum resource capacity for the identified virtual machine by the total resources from the shared pool on the host, e.g., where the resources are processors, the number of processors on the host. The determined remaining resource capacities from block 324 may then be used to attempt to identify one or more candidate hosts that have sufficient unused capacity to support allocating to the identified virtual machine the minimum resource capacity for the identified virtual machine on the candidate host after accounting for the respective desired resource capacities for the other virtual machines placed on the candidate host.

It will be appreciated that multiple candidate hosts may have sufficient remaining resource capacities based upon the calculations in block 324, and as such, block 324 passes control to block 326 to determine whether multiple such candidate hosts exist. If so, control passes to block 328 to determine which, among the multiple candidate hosts, have the most unused remaining resource capacity, e.g., the lowest value calculated in block 324. Block 328, in particular, determines whether multiple candidate hosts have the most unused remaining resource capacity, and if not (indicating that there is a single candidate host having the most remaining resource capacity) control passes to block 330 to migrate or move the identified virtual machine to that single candidate host and allocate to that identified virtual machine the minimum resource capacity for the identified virtual machine on the candidate host. Control then returns to block 304 to process additional virtual machines.

Returning to block 328, if multiple candidate hosts have the most unused remaining resource capacity (e.g., two or more candidate hosts have the same value calculated in block 324), control may pass to block 332 to select one of the candidate hosts to minimize resource contention, e.g., based upon priorities or weightings such as shared weights assigned to the virtual machines. For example, block 332 may select a candidate host where the sum of shared weight values for all virtual machines placed on the host is the lowest, whereby the identified virtual machine is moved to that candidate host and allocated the minimum resource capacity. Control then returns to block 304 to process additional virtual machines.

Returning to block 326, if multiple candidate hosts are not identified, control passes to block 334 to determine if there is a single host having sufficient remaining resource capacity. If so, control passes to block 336 to move the identified virtual machine to the single host and allocate the minimum resource capacity to the identified virtual machine. Control then returns to block 304 to process additional virtual machines.

Returning to block 334, if no host is identified having sufficient remaining resource capacity based upon the calculations in block 324, control returns to block 304 to process additional virtual machines, leaving the identified virtual machine on its original home host. Further, once no further virtual machines are identified in block 304, the rebalancing operation is complete.

It will be appreciated that, in contrast to other placement policies, virtual machines may be placed on hosts where they generally have a greater chance of obtaining the most resource capacity across the hosts participating in the shared pool and with fewer relocations. It will also be appreciated that other placement policies may be implemented using the herein-described techniques, and based upon multiple resource capacities maintained for each virtual machine, as will be apparent to those of ordinary skill having the benefit of the instant disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of rebalancing a workload of a virtualized computing environment, the virtualized computing environment of a type including a shared pool of resources disposed in a plurality of hosts and a plurality of virtual machines resident on the plurality of hosts and configured to share the shared pool of resources, wherein the virtualized computing environment stores, for each virtual machine among the plurality of virtual machines, a respective first resource capacity that represents a first portion of the shared pool of resources for the respective virtual machine and a respective second resource capacity that represents a second portion of the shared pool of resources for the respective virtual machine that is greater than that of the first resource capacity, the method comprising:

identifying a virtual machine among the plurality of virtual machines that is allocated a smaller portion of the shared pool of resources than that of the respective second resource capacity for the respective second portion;

determining using at least one processor if a home host for the identified virtual machine has sufficient unused capacity to support allocating to the identified virtual machine the respective second resource capacity for the identified virtual machine on the home host;

in response to determining that the home host for the identified virtual machine has sufficient unused capacity to support allocating to the identified virtual machine the respective second resource capacity for the identified virtual machine on the home host, resizing the identified virtual machine on the home host to allocate at least the respective second resource capacity to the identified virtual machine;

in response to determining that the home host for the identified virtual machine has insufficient unused capacity to support allocating to the identified virtual machine the respective second resource capacity for the identified virtual machine on the home host, attempting to identify a first candidate host among the plurality of hosts that has sufficient unused capacity to support allocating to the identified virtual machine the respective second resource capacity for the identified virtual machine on the first candidate host after accounting for the respective second resource capacity for each virtual machine among the plurality of virtual machines that is already resident on the first candidate host;

in response to identifying the first candidate host, moving the identified virtual machine to the candidate host and allocating to the identified virtual machine the respective second resource capacity for the identified virtual machine on the first candidate host;

in response to failing to identify the first candidate host, attempting to identify a second candidate host among the plurality of hosts that has sufficient unused capacity to support allocating to the identified virtual machine the respective first resource capacity for the identified virtual machine on the second candidate host after accounting for the respective second resource capacity for each virtual machine among the plurality of virtual machines that is already resident on the second candidate host; and in response to identifying the second candidate host, moving the identified virtual machine to the second candidate host and allocating to the identified virtual machine the respective first resource capacity for the identified virtual machine on the second candidate host;

wherein attempting to identify the second candidate host includes identifying multiple hosts among the plurality of hosts having sufficient unused capacity to support allocating the respective first resource capacity to the identified virtual machine after accounting for the respective second resource capacities for virtual machines already resident thereon and selecting the second candidate host from among the multiple hosts based upon the second candidate host having a greatest remaining resource capacity from among the multiple hosts, wherein a respective remaining resource capacity for the second candidate host is equal to that of another host among the multiple hosts, wherein selecting the second candidate host further includes selecting the second candidate host over the other host to minimize resource contention, wherein the virtualized computing environment further stores, for each virtual machine among the plurality of virtual machines, a respective shared weight representing a ratio to which the respective virtual machine receives unused resource capacity relative to other virtual machines, and wherein selecting the second candidate host over the other host to minimize resource contention includes selecting the second candidate host based upon the second candidate host having a lower sum of shared weights for virtual machines resident on the second candidate host than that of the other host.

2. The method of claim 1, further comprising, in response to failing to identify the second candidate host, leaving the identified virtual machine on the home host.

3. The method of claim 1, wherein attempting to identify the second candidate host includes determining a remaining resource capacity for the second candidate host by dividing a sum of the respective second resource capacities for virtual machines resident on the second candidate host and that of the identified virtual machine by a total resource capacity for the second candidate host.

4. The method of claim 1, wherein attempting to identify the first candidate host includes:
   identifying multiple hosts among the plurality of hosts having sufficient unused capacity to support allocating the respective second resource capacity to the identified virtual machine after accounting for the respective second resource capacities for virtual machines already resident thereon; and
   selecting the first candidate host from among the multiple hosts based upon the first candidate host having a greatest remaining resource capacity from among the multiple hosts.

5. The method of claim 4, wherein a respective remaining resource capacity for the first candidate host is equal to that of another host among the multiple hosts, and wherein selecting the first candidate host further includes selecting the first candidate host over the other host to minimize resource contention.

6. The method of claim 5, wherein selecting the first candidate host over the other host to minimize resource contention includes selecting the first candidate host based upon the first candidate host having a lower sum of shared weights for virtual machines resident on the first candidate host than that of the other host.

7. The method of claim 1, wherein the first resource capacity for each respective virtual machine is a minimum resource capacity that represents an assured portion of the shared pool of resources for the respective virtual machine, and wherein the second resource capacity for each respective virtual machine is a desired resource capacity that represents a desired portion of the shared pool of resources for the respective virtual machine that is greater than the assured portion represented by the minimum resource capacity.

8. The method of claim 1, wherein the shared pool of resources includes a shared pool of processor resources, and wherein each first and second resource capacity represents a portion of the shared pool of processor resources.

9. The method of claim 1, wherein the shared pool of resources includes a shared pool of memory resources, and wherein each first and second resource capacity represents a portion of the shared pool of memory resources.

10. The method of claim 1, wherein identifying the virtual machine among the plurality of virtual machines includes identifying multiple virtual machines allocated respective smaller portions of the shared pool of resources than that of the respective second resource capacities for the respective second portions, the method further comprising, for each such identified virtual machine among the multiple identified virtual machines:
   resizing such identified virtual machine on a respective home host therefor in response to determining that the respective home host has sufficient unused capacity to support allocating to such identified virtual machine the respective second resource capacity;

moving such identified virtual machine to a respective first candidate host and allocating to such identified virtual machine the respective second resource capacity for such identified virtual machine on the respective first candidate host in response to identifying the respective first candidate host as having sufficient unused capacity to support allocating to such identified virtual machine the respective second resource capacity after accounting for the respective second resource capacity for each virtual machine among the plurality of virtual machines that is already resident on the respective first candidate host;

moving such identified virtual machine to a respective second candidate host and allocating to such identified virtual machine the respective first resource capacity for such identified virtual machine on the respective second candidate host in response to identifying the respective second candidate host as having sufficient unused capacity to support allocating to such identified virtual machine the respective first resource capacity after accounting for the respective second resource capacity for each virtual machine among the plurality of virtual machines that is already resident on the respective second candidate host; or leaving such identified virtual machine on the home host in response to a failure to identify the respective first or second candidate host.

* * * * *